May 27, 1930. H. P. SLEEMAN 1,760,786
COUPLING FOR INSULATORS
Filed Oct. 17, 1928
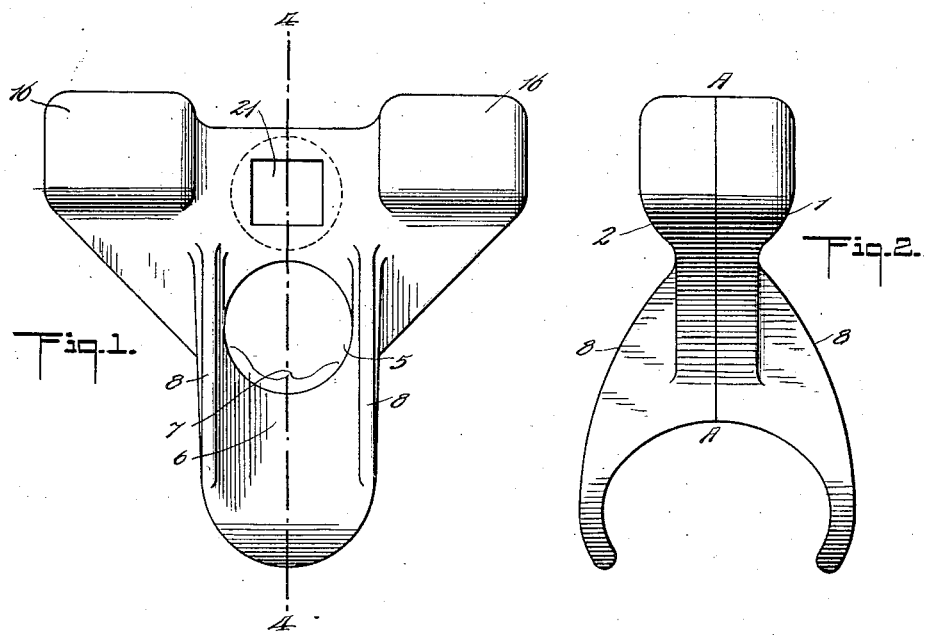
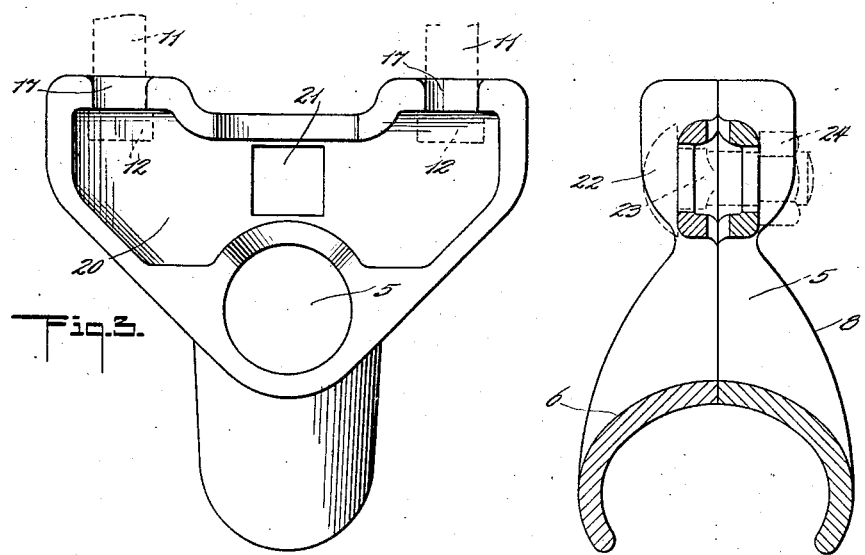
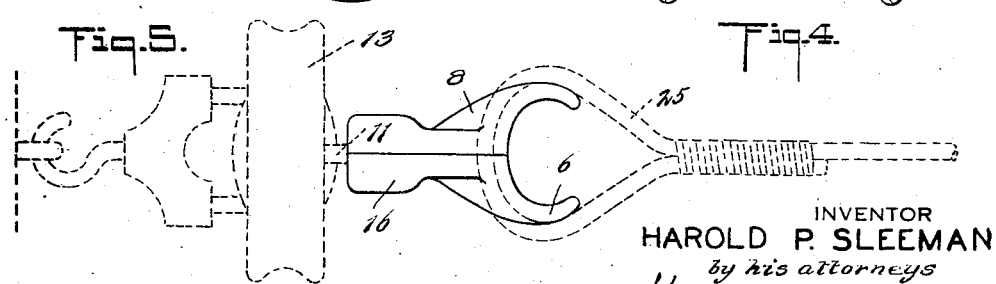
INVENTOR
HAROLD P. SLEEMAN
by his attorneys
Howson and Howson Patented May 27, 1930

1,760,786

UNITED STATES PATENT OFFICE

HAROLD P. SLEEMAN, OF LISBON, OHIO, ASSIGNOR TO THE R. THOMAS & SONS COMPANY, OF LISBON, OHIO, A CORPORATION OF OHIO

COUPLING FOR INSULATORS

Application filed October 17, 1928. Serial No. 313,151.

This invention relates to couplings used with electrical insulators and more specifically to the type of couplings for use with insulators of the Hewlett or link type where insulators are to be coupled to a cable or wire.

In the Hewlett or link type of the electric insulator and in some other types of insulators now in use, the fitting or coupling between the insulator and cable consists of a U-link passed through a curved opening in one side or end of the insulator and an adapter consisting of two identical body halves which when united grip the feet of the U-link and provide an eye through which can be threaded the cable and a protecting thimble or saddle which is used to prevent kinking of the cable. According to the present invention the necessity for a separate thimble is done away with and the adapter still has only two parts, namely the two halves of the body. Each half will, as usual, have the necessary spaced recesses for reception of the heads of the U-bolt and the centrally located opening through which the thimble formerly was threaded. The openings and recesses of each half are in register for the purpose of gripping the U-link and providing an eye through which the cable may be threaded.

According to the present invention instead of using a separate thimble, each half of the coupling will have a downwardly bent lip or trough extending outwardly from the opening through which the thimble was formerly threaded. These lips will provide a smooth, curved passage or saddle for reception of the cable when the two halves are assembled. Each lip may be carried downwardly and have side walls to afford the protection and support heretofore furnished by the thimble. It will be observed that in this way the necessity for the thimble has been completely eliminated and the size of the side walls of the thimble is not limited by the size of the eye.

My device accomplishes the functions of the eye and thimble and of the adapter, but I use only a single unit and employ only two parts whereas an assembly of three parts was formerly required.

Other advantages of my invention will appear as my invention is more fully described.

In the drawing—

Figure 1 shows a side elevation of my thimble adapter;

Figure 2 shows an end elevation of my thimble adapter as shown in Figure 1;

Figure 3 is an elevation showing the inside of one-half of my thimble adapter;

Figure 4 is a sectional elevation through the adapter taken on line 4—4 of Figure 1.

Figure 5 is a side view of a strain insulator installation showing the location of and function performed by my adapter when in use.

Referring now to the drawing it will be noted that my adapter is made in two cooperating parts, 1 and 2. These parts are identical and are somewhat in the shape of an isosceles triangle, as in the Bower Patent 1,508,158. Each part has near its apex an opening or eye 5 with a curved, grooved lip or trough 6 extending from it in a direction away from the base of the triangle. These lips 6 extend in a plane perpendicular to the plane AA of the adapter as defined by the abutting surfaces, of the two halves of the adapter.

I have shown my invention with the base of the triangle as the top and the apex as the bottom of the adapter. The top of my adapter has at each corner a lobe 16 hollowed out and apertured in its top surface, as at 17 by making grooves in the top of each half of the adapter, to accommodate the legs 11 and the feet 12 of a U-link of a Hewlett type insulator, 13. For the purpose of clamping the two parts of the adapter together there is at the center near the top of the adapter a squared aperture 21 adapted to receive a squared portion 23 beneath a head 22 of a clamping bolt. When a nut 24 is screwed on this bolt the parts 1 and 2 of the adapter will be firmly clamped together. Lips 6 have sides 8 extending up from them to the body of the adapter for the purpose of giving strength to the lips and affording protection to a cable 25 which may be passed through the eye 5.

Parts 1 and 2 are identical in form so that when they are clamped together the lobes 16, apertures 21, openings 5, and the grooves forming the apertures 17 will all register.

In this way the clamping bolt 22 may be passed through the aperture 21, and the feet of the U-links will be grasped and held within the lobes 16 and a cable may be threaded through eye 5.

It will further be noted that lips 6 will register and form a smooth, curved, grooved saddle 7 for the cable.

While I have described my adapter as having generally triangular shape it is not essential that a triangular shape be used; many other shapes may occur to those skilled in the art, which shapes are within the scope of my invention.

The sides 8 of the lips 6 function in transmitting the strain from the saddle to the whole body portion of the adapter. It will be noted that by making a lip in connection with each cable opening 5, I am enabled to do away with the customary thimble that is used with adapters of this type since the cooperation of the eye and lip in each piece will perform the functions of the eye and thimble commonly used in the adapters of the prior art.

I have shown and described my adapter with the lips 6 lying in a plane perpendicular to the dividing plane AA between the two parts of the adapter but it is obvious that my invention is not confined to an adapter which is divided as shown. Thus, in the appended claims I do not limit my invention to the specific construction shown but I claim my invention broadly.

Thus I have invented a two piece construction which will be simpler to assemble, easier to make, and is more rigid and durable than the prior three or more pieced constructions that were necessary to meet the requirements of the situations in which my adapter may be used. In addition to these advantages my adapter is made of two interchangeable and identical parts so that only one mold or die will be necessary to cast or stamp out my invention.

Many other changes in shape and form within the scope of my invention will occur to those skilled in the art.

Having described my invention what I claim and desire to secure by Letters Patent is:

1. An adapter composed of two parts, means whereby said parts may be secured together to grip the legs and feet of a U-link, said parts each having an aperture therein combining to form an eye, and means integral with each part of said adapter cooperating with said eye to form a thimble.

2. An adapter composed of two identically formed, symmetrical parts, means whereby said parts may be secured together to grip the legs and feet of a U-link, and an aperture with cooperating lips on each half of said adapter, adapted to form an eye and thimble when the halves are clamped together.

3. An adapter composed of two parts, each part having an eye formed therein, means whereby said parts may be secured together to grip the legs and feet of a U-link, and means integral with said adapter forming a thimble, in connection with said eye, said eye and thimble having side portions associated therewith to support and strengthen the thimble.

4. A two part adapter having means adapted to receive and hold the feet of a U-link, means whereby said parts may be fastened together, means forming an eye, a saddle associated therewith shaped to form a seat for a cable which may be passed through the eye, part of said saddle being integral with each part of said adapter, the plane of the adapter being perpendicular to the plane of said saddle.

5. In an adapter, means forming an eye for a cable, a cable saddle formed integrally with said eye, a chamber within the adapter, apertures leading from the outside at the top of said adapter to said chamber said apertures and chamber being adapted to receive and hold the legs and feet of a U-link.

6. A two part adapter usable in connection with a string of insulators having U-links, said adapter having means at one end to grasp and hold the feet of a U-link between said parts and at the opposite end having an eye through which a cable may be passed and a curved saddle formed with said eye out of both said parts to create a curved seat for said cable.

In testimony whereof I have signed my name to this specification.

HAROLD P. SLEEMAN.